United States Patent [19]

Hattori et al.

[11] 4,094,273
[45] June 13, 1978

[54] AIR-FUEL RATIO ADJUSTING SYSTEM

[75] Inventors: Tadashi Hattori, Okazaki; Takamichi Nakase, Gamagori, both of Japan

[73] Assignee: Nippon Soken, Inc., Nishio, Japan

[21] Appl. No.: 699,606

[22] Filed: Jun. 24, 1976

[30] Foreign Application Priority Data

Jul. 14, 1975 Japan .................... 50-86565

[51] Int. Cl.² .................... F02B 3/00; F02M 7/12; F02M 23/04
[52] U.S. Cl. .................... 123/32 EE; 123/140 MC; 123/119 EC; 123/124 B; 123/119 D; 123/119 DB
[58] Field of Search ..... 123/119 EC, 119 D, 119 DB, 123/32 EE, 32 EA, 124 B, 140 MC; 60/276, 285

[56] References Cited

U.S. PATENT DOCUMENTS

| 3,759,232 | 9/1973 | Wahl et al. .................... 123/32 EE |
| 3,841,283 | 10/1974 | Wood .................... 123/119 EC |
| 3,868,933 | 3/1975 | Bigalke et al. .................... 123/119 D |
| 3,923,016 | 12/1975 | Hoshi .................... 123/32 EE |
| 3,991,726 | 11/1976 | Kawai et al. .................... 123/32 EA |
| 4,023,357 | 5/1974 | Masaki .................... 60/276 |
| 4,027,478 | 6/1977 | Masaki et al. .................... 60/285 |

FOREIGN PATENT DOCUMENTS 1,961,438  7/1970  Germany .................... 123/124 B

*Primary Examiner*—Charles J. Myhre
*Assistant Examiner*—Parshobam S. Lall
*Attorney, Agent, or Firm*—Cushman, Darby & Cushman

[57] ABSTRACT

In an air-fuel ratio adjusting system for an internal combustion engine equipped with a carburetor having a bypass air passage for controlling an air-fuel ratio of an air-fuel mixture to be supplied to the engine, a bypass valve disposed in the bypass passage is so arranged as to move during no-load running of the engine at a speed lower than that during the normal running of the engine under the load, thereby to prevent disadvantages such as the engine stall.

4 Claims, 5 Drawing Figures

FIG. 2
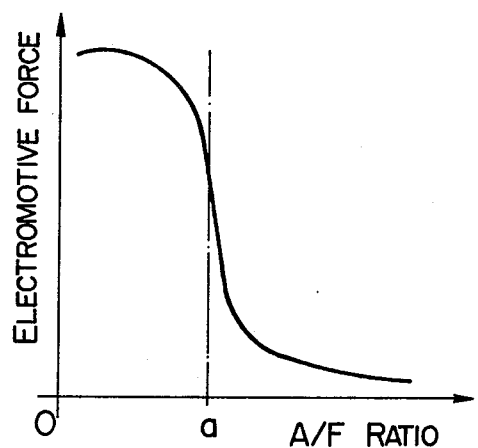
FIG. 4A  FIG. 4B
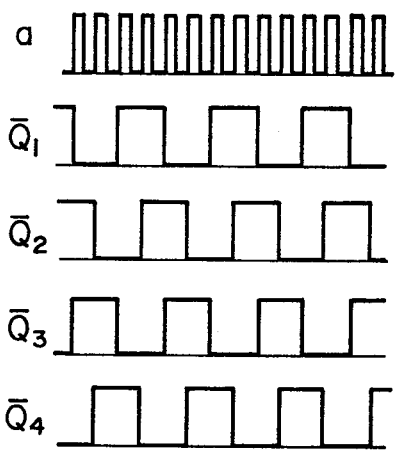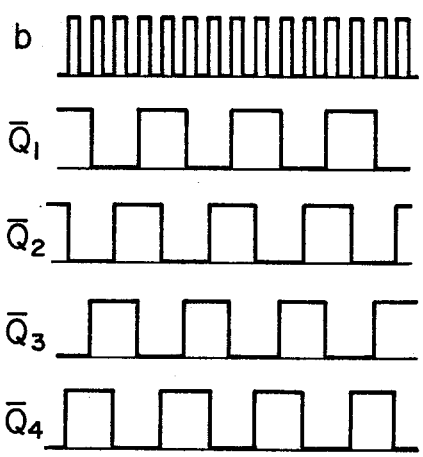

AIR-FUEL RATIO ADJUSTING SYSTEM

The present invention relates to an air-fuel ratio adjusting system for an internal combustion engine wherein in order to accomplish the desired exhaust emission control of the engine, the air-to-fuel ratio of the mixture exhausted into the exhaust pipe is fed back so that the air-to-fuel ratio of the mixture fed to the engine is adjusted to the correct value to suit the operating conditions of the engine.

In a known air-fuel ratio adjusting system of the above type, the air-to-fuel ratio of the mixture is detected from for example the concentration of oxygen in the exhaust gases by an air/fuel ratio sensor disposed in the exhaust pipe of the engine and a control valve responsive to the output signal of the air/fuel ratio sensor for controlling the amount of additional air or fuel is operated to maintain the air-to-fuel ratio of the mixture at the correct value. A disadvantage of this type of air-fuel ratio adjusting system is that the control speed of the control valve is adjusted to a fairly high speed so as to adjust the air-to-fuel ratio of the mixture with a high degree of accuracy under various operating conditions of the engine, particularly during such transient periods as the periods of acceleration and deceleration and moreover the delay of the entire system of the engine is increased under racing condition (no-load operating condition) of the engine, thus making the no-load operation of the engine unstable under the racing condition, particularly during the periods of warm-up and occasionally causing the engine to stop operating.

It is therefore an object of the present invention to provide an improved air-fuel ratio adjusting system which overcomes the foregoing difficulty.

Thus, in accordance with the present invention, under racing condition of an internal combustion engine the control valve may be controlled at a speed lower than the ordinary control speed thus ensuring stable racing operating condition of the engine and thereby preventing the stoppage of operation of the engine.

The above and other objects, features and advantages of the invention will become apparent from the following detailed description taken in conjunction with the accompanying drawings, in which:

FIG. 2 is an output characteristic diagram of the air/fuel ratio sensor shown in FIG. 1.

FIGS. 4A and 4B are waveform diagrams illustrating the operation of the reversible shift register shown in FIG. 1.

An embodiment of the invention will now be described with reference to the drawings.

Figure 1:
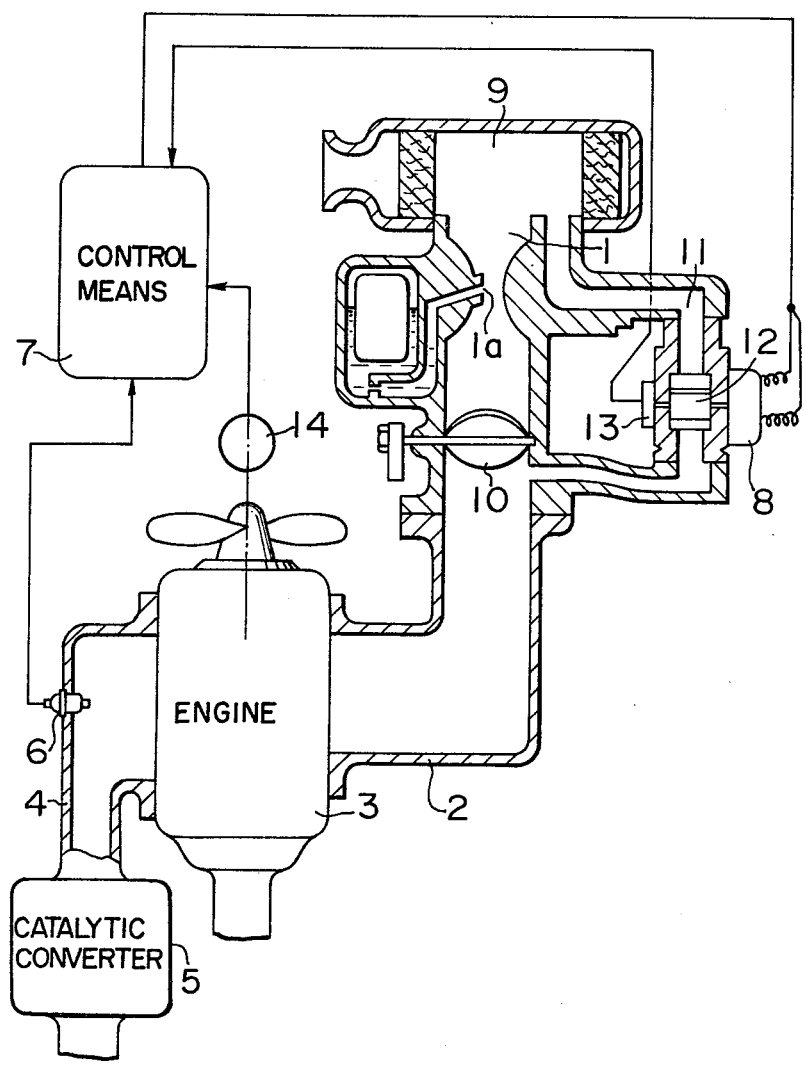
FIG. 1 is a schematic diagram showing an embodiment of an air-fuel ratio adjusting system according to the invention.

Referring first to FIG. 1 schematically showing the embodiment of the invention, numeral 1 designates a carburetor coupled to an intake manifold 2 of an internal combustion engine 3 for supplying fuel to the intake manifold 2 through a fuel nozzle 1a, wherein the amount of fuel is proportional to the flow rate of air determined by the opening of a throttle valve 10. The carburetor 1 further includes an air cleaner 9 and a compensating air passage 11 communicating with the carburetor 1 downstream of the throttle valve 10, while there are provided a bypass valve 12 (control valve) for controlling flow rate air (amount of air) flowing through the compensating air passage 11 and driving means 8 for operating the bypass valve 12 which may for example be a pulse motor. Numeral 13 designates a preset position sensor for detecting a preset position of the bypass valve 12 such position enables the valve 12 to supply air-fuel mixture with the air-to-fuel ratio required under racing condition, particularly during the warm-up periods of the engine 3. This present position normally preferably corresponds to the fully closed position of the bypass valve 12 so that when the bypass valve 12 is placed in the fully closed position, the contacts of the preset position sensor 13 for detecting the fully closed position are closed. Numeral 5 designates a catalytic converter disposed in a rear portion of an exhaust manifold 4, 6 an air/fuel ratio sensor disposed in the exhaust manifold 4 and employing for example zirconium oxide for detecting the concentration of oxygen in the exhaust gases and thereby detecting the air-to-fuel ratio of the mixture fed to the engine. The output electromotive force of the air/fuel ratio sensor 6 changes in a step fashion when the air-to-fuel ratio is near the stoichiometric one (designated at a point $a$) as shown in FIG. 2. Numeral 14 designates no-load detecting means or sensor for detecting the racing condition (no-load operating condition) of the engine 3, which may for example be a switch adapted to detect that the clutch has been disengaged or the shift lever of the gear transmission has been placed in the neutral position and in this case the switch is set so that it is closed when the engine is under no load condition.

Numeral 7 designates control means which receives as its inputs the output signals of the air/fuel ratio sensor 6, the preset position sensor 13 and the no-load detecting means 14 and operates the air-fuel ratio adjusting means comprising the pulse motor 8 and the bypass valve 12 in accordance with these output signals to adjust the air-to-fuel ratio of the mixture.

Figure 3:
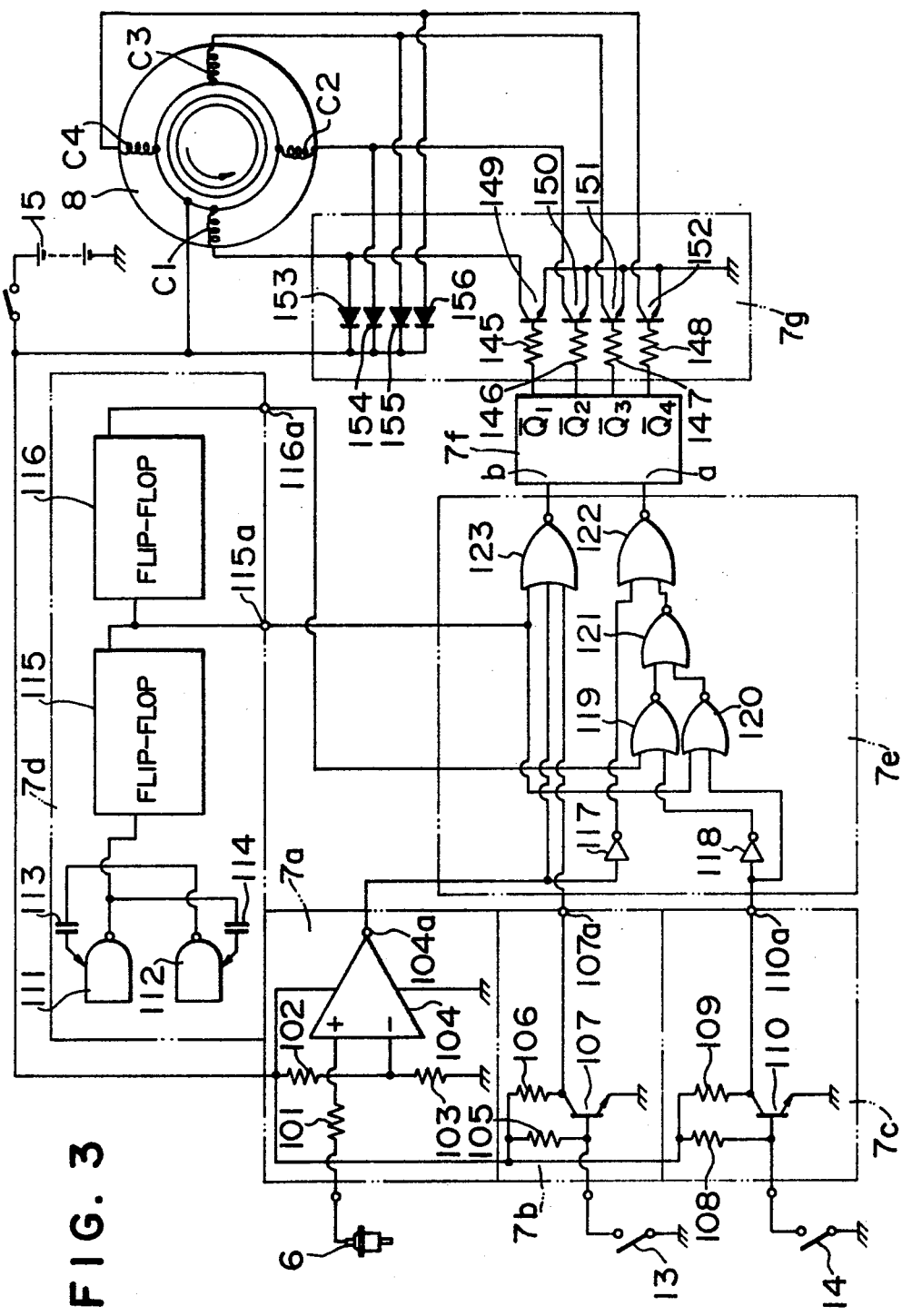
FIG. 3 is a wiring diagram of the control means shown in FIG. 1.

The details of the control means 7 will now be described with reference to FIG. 3. In the Figure, numeral 7a designates an air/fuel ratio detecting circuit comprising a resistor 101, a comparator 104 and voltage dividing resistors 102 and 103 for applying a preset voltage to the inverting input terminal of the comparator 104 whose noninverting input terminal is in turn connected to the air/fuel ratio sensor 6 disposed in the exhaust manifold 4. The preset voltage determined by the dividing resistors 102 and 103 is set to a valve slightly smaller than the electromotive force generated from the air/fuel ratio sensor 6 at substantially the stoichiometric air-to-fuel ratio. Consequently, when the air-to-fuel ratio detected by the sensor 6 is smaller than the stoichiometric one, namely, when the mixture is rich, a "1" level signal is generated at an output terminal 104a of the air/fuel ratio detecting circuit 7a, whereas when the detected air-to-fuel ratio is greater than the stoichiometric one a "0" level signal is generated at the output terminal 104a.

Numeral 7b designates a preset position detecting circuit comprising resistors 105 and 106 and a transistor 107 wherein the base of the transistor 107 is connected to the preset position sensor 13 and to a power source 15 through the resistor 105. The preset position sensor 13 is designed so that its contacts are closed when the bypass valve 12 is in the preset position (the fully closed position). Thus, when the contacts are closed, the transistor 107 is turned off and a "1" level signal is generated at an output terminal 107a of the preset position detecting circuit 7b. Contrary, when the bypass valve 12 is not in the present position, a "0" level signal is generated at the output terminal 107a.

Numeral 7c designates a no-load detecting circuit comprising resistors 108 and 109 and a transistor 110, wherein the base of the transistor 110 is connected to the no-load sensor 14 and to the power source 15 through the resistor 108. Since the no-load sensor 14 is designed so that its contacts are closed when the engine 3 is racing (no-load operating condition), when the contacts are closed, the transistor 110 is turned off and a "1" level signal is generated at an output terminal 110a of the no-load detecting circuit 7c, whereas under other operating conditions of the engine a "0" level signal is generated at the output terminal 110a.

Numeral 7d designates a pulse generator comprising an astable multivibrator including NAND gates 111 and 112 with expander terminals and capacitors 113 and 114 and a frequency divider circuit including flip-flops 115 and 116. The pulse generator 7d has a first output terminal 115a for delivering the output pulses of the astable multivibrator subjected to ½ frequency division and a second output terminal 116a for delivering the astable multivibrator output pulses subjected to ¼ frequency division.

The output of the air/fuel ratio detecting circuit 7a is applied to a NOR gate 123 and it is also inverted by an inverter 117 and applied to a NOR gate 122. The output of the preset position detecting circuit 7b is applied to the NOR gate 123, while the output of the no-load detecting circuit 7c is applied to a NOR gate 120 and it is also inverted by an inverter 118 and applied to a NOR gate 119. The astable multivibrator output pulses subjected to ½ frequency division and generated at the first output terminal 115a are applied to the NOR gates 120 and 123, respectively, and the NOR gate 119 receives the astable multivibrator output pulses subjected to ¼ frequency division and generated at the second output terminal 116a. The outputs of the NOR gates 119 and 120 are applied to a NOR gate 121 whose output is in turn applied to the NOR gate 122.

The outputs of the NOR gates 122 and 123 are respectively applied to input terminals a and b of a reversible shift register 7f, so that when the pulse signals are applied to the input terminal a, its output terminals $\overline{Q_1}$, $\overline{Q_2}$, $\overline{Q_3}$ and $\overline{Q_4}$ are sequentially shifted as shown in FIG. 4A. On the other hand, when the pulse signals are applied to the input terminal b, the output terminals $\overline{Q_4}$, $\overline{Q_3}$, $\overline{Q_2}$ and $\overline{Q_1}$ are sequentially shifted as shown in FIG. 4B. The output terminals $\overline{Q_1}$, $\overline{Q_2}$, $\overline{Q_3}$ and $\overline{Q_4}$ are connected to a switching circuit 7g comprising resistors 145, 146, 147 and 148, transistors 149, 150, 151 and 152 are counter electromotive force absorbing diodes 153, 154, 155, and 156, and the switching circuit 7g is connected to field coils $c_1, c_2, c_3$ and $c_4$ of a pulse motor 8. Consequently, when the pulse signals are applied to the input terminal a of the reversible shift register 7f, the transistors 149, 150, 151 and 152 are sequentially turned on and the field coils $c_1, c_2, c_3$ and $c_4$ of the pulse motor 8 are sequentially energized, thus rotating the pulse motor 8 in the direction of the arrow shown in FIG. 3 and thereby operating the bypass valve 12 in a direction which opens it. On the other hand, when the pulse signals are applied to the other input terminal b, the pulse motor 8 is rotated in a direction opposite to the direction of the arrow and the bypass valve 12 is rotated in a direction which close it.

With the constructed described above, the operation of the system of this ivention will now be described.

When the bypass valve 12 is not in its fully closed position (the preset position) and when the engine is operating under load, the contacts of the preset position sensor 13 and the no-load sensor 14 are both open and thus "0" level signals are generated at both the output terminal 107a of the preset position detecting circuit 7b and the output terminal 110a of the no-load detecting circuit 7c, respectively. In this condition, when the air/fuel ratio detecting circuit 7a detects that the air-to-fuel ratio of the mixture is smaller than the stoichiometric one, i.e., the mixture is rich thus generating a "1" level signal at its output terminal 104a, this "1" level signal is applied to the NOR gate 123 so that the NOR gate 123 generates a "0" level signal and the reversible shift register 7f is not operated by the pulses from terminal 115a. The "1" level signal generated at the output terminal 104a is also inverted by the inverter 117 and the resulting "0" level signal is applied to the NOR gate 122. Since the "0" level signal has been generated at the output terminal 110a of the no-load detecting circuit 7c as mentioned earlier, the output pulses subjected to ½ frequency division and generated at the first output terminal 115a of the pulse generator 7d are applied to the NOR gate 121 through the NOR gate 120, while the said "0" level signal has been inverted by the inverter 118 and the resulting "1" level signal has been applied to the NOR gate 119 thus applying a "0" level signal to the NOR gate 121. Consequently, the pulse signals subjected to ¼ frequency division appearing at terminal 116a are applied to one input terminal of the NOR gate 122 through the NOR gate 121 so that since the "0" level signal has been applied to the other input terminal of the NOR gate 122 through the inverter 117 as mentioned earlier, the ¼ frequency divided pulse signals are applied to the input terminal a of the reversible shift register 7f and its output terminals $\overline{Q_1}$, $\overline{Q_2}$, $\overline{Q_3}$ and $\overline{Q_4}$ are shifted sequentially. Thus, the field coils $c_1, c_2, c_3$ and $c_4$ of the pulse motor 8 are sequentially energized and the pulse motor 8 is rotated in the direction of the arrow in the illustration operating the bypass valve 12 in a direction which opens it. When the bypass valve 12 is operated in the direction which opens it, the rate of flow of the air through the compensating air passage 11 is increased and the richness of the mixture is reduced, thus controlling the air-to-fuel ratio of the mixture to attain the stoichiometric one.

Similarly, with the engine operating under load and the bypass valve 12 not placed in the fully closed position (the preset position), when the air/fuel ratio detecting circuit 7a detects that the air-to-fuel ratio of the mixture is greater than the stoichiometric one, namely, the mixture is lean so that a "0" level signal is generated at its output terminal 104a, this "0" level signal is inverted by the inverter 117 and the resulting "1" level signal is applied to the NOR gate 122, thus blocking that gate. Consequently, the NOR gate 122 applies a "0" level signal to the input terminal a of the reversible shift register 7f and thus the reversible shift register 7f is not operated. On the other hand, the "0" level signal at the output terminal 104a of the air/fuel ratio detecting circuit 7a is applied to the NOR gate 123 so that since the "0" signal has also been applied from the preset position detecting circuit 7b to the NOR gate 123, the pulse signals subjected to ½ frequency division and generated at the first output terminal 115a of the pulse generator 7d are applied to the input terminal b of the reversible shift register 7f. Consequently, the output terminals $\overline{Q_4}$, $\overline{Q_3}$, $\overline{Q_2}$ and $\overline{Q_1}$ of the reversible shift register 7f are shifted sequentially and the field coils $c_4$, $c_3$, $c_2$ and $c_1$ of the pulse motor 8 are sequentially energized thus rotating the pulse motor 8 in a direction opposite to the direction of the arrow in the illustration and thereby operating the bypass valve 12 in a direction which closes it. When the bypass valve 12 is rotated in the direction which closes it, the rate of flow of the air through the compensating air passage 11 is decreased and the mixture is enriched to control its air-to-fuel ratio to attain the stoichiometric one. When the bypass valve 12 is operated into its fully closed position, the contacts of the present position sensor 13 are closed so that a "1" level signal is generated at the output terminal 107a of the preset position detecting circuit 7b and this "1" level signal is applied to the NOR gate 123 causing its output to go to the "0" level. Thus, the bypass valve 12 is prevented from being operated further in the direction which closes it and in this way any damage to the bypass valve 12 as well as burning of the pulse motor 8 are prevented.

Next, the operation of the system under racing condition (no-load operating condition) of the engine will be described.

During racing operation of the engine, the contacts of the no-load sensor 14 are closed and a "1" level signal is generated at the output terminal 110a of the no-load detecting circuit 7c. This "0" level signal is applied to the NOR gate 120 causing its output to go to the "0" level. This "1" level signal is also inverted by the inverter 118 and the resulting "O" level signal is applied to the NOR gate 119. Consequently, the pulse signals subjected to ¼ frequency division and generated at the second output terminal 116a of the pulse generator 7d are generated at the output of the NOR gate 119 and these pulse signals are applied to one input terminal of the NOR gate 122 through the NOR gate 121. In this condition, when the air/fuel ratio detecting circuit 7a detects that the air-to-fuel ratio of the mixture is smaller than the stoichiometric one generating a "1" level signal at its output terminal 104a, this "1" level signal is inverted by the inverter 117 and the resulting "O" level signal is applied to the other input terminal of the NOR gate 122. Consequently, the ¼ frequency divided pulse signals are applied to the input terminal a of the reversible shift register 7f through the NOR gate 122 and the pulse motor 8 is rotated in the direction of the arrow in the illustration. In this case, the control speed of the bypass valve 12 is reduced to one half of that used when the ½ frequency divided pulse signals are applied to the reversible shift register 7f and thus the bypass valve 12 is controlled slowly when the engine is being raced.

While the pulse signals generated at the first and second output terminals 115a and 116a of the pulse generator 7d are produced respectively at ½ and ¼ of the output pulse frequency of the astable multivibrator, any other frequency dividing ratios may be used or alternately the oscillation frequency of the astable multivibrator may be suitably adjusted.

Further, while, in the above-described embodiment, the control speed of the bypass valve 12 is reduced where it is designed so that the bypass valve 12 is opened when the engine is operating under no load, the ¼ frequency divided pulse signals may also be applied to the NOR gate 123 so that the bypass valve 12 is slowly closed under no-load operating condition of the engine.

Still further, while, in the above-mentioned embodiment, the method of adjusting the air-to-fuel ratio by controlling the amount of additional air is used, it is of course possible to adjust the air-to-fuel ratio by controlling the amount of fuel supplied from the carburetor.

What is claimed is:

1. An air-fuel ratio adjusting system for an internal combustion engine comprising:
    a carburetor connected to an intake manifold of an internal combustion engine and including a main passage and a bypass passage for supplying an air-fuel mixture to said engine;
    said main passage being provided with a main valve for controlling the amount of the air-fuel mixture to be supplied to said engine, and said bypass passage being provided with a bypass valve for adjusting the air-fuel ratio of said air-fuel mixture by controlling the amount of air flowing therethrough;
    a pulse motor coupled to said bypass valve for driving the same;
    air-fuel ratio sensing means mounted in an exhaust manifold of said engine for sensing the air-fuel ratio of the mixture supplied to said engine;
    pulse generating means for generating a first and a second train of pulses, the frequency of said first train of pulses being higher than that of said second train of pulses;
    detecting means for detecting operational conditions of said engine; and
    circuit means connected to said air-fuel ratio sensing means, pulse generating means and said detecting means for supplying said first train of pulses to said pulse motor both when said engine is operated under the no-load and when the air-fuel ratio detected by said air-fuel ratio sensing means exceeds a predetermined value so as to drive said pulse motor in a closing direction of said bypass valve at a speed determined by said first train of pulses, said circuit means supplying said second train of pulses to said pulse motor both when said engine is operated under the no-load and when the air-fuel ratio detected by said air-fuel ratio sensing means is below said predetermined value so as to drive said pulse motor in an opening direction of said bypass valve at a speed determined by said second train of pulses, whereby said bypass valve is driven in such a manner that the moving speed of said bypass valve in the opening direction is slower than that in the closing direction when said engine is under the no-load operation.

2. An air-fuel ratio adjusting system as set forth in claim 1 further comprising;
    position detecting means for detecting the position of said bypass valve, the output from said position detecting means being applied to said circuit means for causing the same to stop the supply of said first and second train of pulses when said bypass valve is in its fully closed position, whereby said bypass valve is prevented from a further driving force in a direction to close.

3. An air-fuel ratio adjusting system for an internal combustion engine comprising:
    a carburetor connected to an intake manifold of an internal combustion engine and including a main passage and a bypass passage for supplying an air-fuel mixture to said engine;
    said main passage being provided with a main valve for controlling the amount of the air-fuel mixture to be supplied to said engine, and said bypass passage being provided with a bypass valve for adjusting the air-fuel ratio of said air-fuel mixture by controlling the amount of air flowing therethrough;

driving means for driving said bypass valve in a valve opening direction and a valve closing direction;

air-fuel ratio sensing means mounted in an exhaust manifold of said engine for sensing the air-fuel ratio of the mixture supplied to said engine;

means for detecting no-load operation of said engine; and circuit means for actuating said driving means so as to drive said bypass valve in the valve closing direction at a first driving speed when the air-fuel ratio sensed by said air-fuel ratio sensing means exceeds a predetermined value during the no-load operation of said engine, said circuit means also actuating said driving means so as to drive said bypass valve in the valve opening direction at a second driving speed slower than said first driving speed when the air-fuel ratio sensed by said air-fuel ratio sensing means is below said predetermined value during the no-load operation of said engine.

4. An air-fuel ratio adjusting system for an internal combustion engine comprising:

a carburetor connected to an intake manifold of an engine for producing and supplying an air-fuel mixture thereto;

air-fuel ratio changing means for changing the air-fuel ratio of the mixture from low to high value and from high to low value;

air-fuel ratio sensing means mounted in an exhaust manifold of said engine for sensing the air-fuel ratio of the mixture supplied to said engine;

means for detecting no-load operation of said engine; and circuit means for actuating said air-fuel ratio changing means to change the air-fuel ratio of the mixture produced at said carburetor from high to low value at a first changing speed when the air-fuel ratio sensed by said air-fuel ratio sensing means exceeds a predetermined value during the no-load operation of said engine, said circuit means also actuating said air-fuel ratio changing means to change the air-fuel ratio of the mixture produced at said carburetor from low to high value at a second changing speed when the air-fuel ratio sensed by said air-fuel ratio sensing means is below said predetermined value during the no-load operation of said engine, wherein said second changing speed is slower than said first changing speed.

* * * * *